United States Patent
Kato

(10) Patent No.: US 9,310,777 B2
(45) Date of Patent: Apr. 12, 2016

(54) RADIO-CONTROLLED WRISTWATCH

(75) Inventor: Akira Kato, Sayama (JP)

(73) Assignees: CITIZEN HOLDINGS CO., LTD., Tokyo (JP); CITIZEN WATCH CO., LTD., Tokyo (JP)

(*) Notice: Subject to any disclaimer, the term of this patent is extended or adjusted under 35 U.S.C. 154(b) by 0 days.

(21) Appl. No.: 14/237,889

(22) PCT Filed: Aug. 1, 2012

(86) PCT No.: PCT/JP2012/069624
§ 371 (c)(1),
(2), (4) Date: Feb. 10, 2014

(87) PCT Pub. No.: WO2013/021899
PCT Pub. Date: Feb. 14, 2013

(65) Prior Publication Data
US 2014/0226446 A1    Aug. 14, 2014

(30) Foreign Application Priority Data
Aug. 11, 2011  (JP) ................ 2011-176192

(51) Int. Cl.
*G04R 20/00* (2013.01)
*G04G 9/00* (2006.01)
(Continued)

(52) U.S. Cl.
CPC . *G04G 9/00* (2013.01); *G01S 19/34* (2013.01); *G04R 20/04* (2013.01); *G04R 20/06* (2013.01)

(58) Field of Classification Search
CPC ........................................ G04R 20/00–20/06
See application file for complete search history.

(56) References Cited

U.S. PATENT DOCUMENTS 7,715,279 B2 * 5/2010 Urano et al. .............. 368/47

7,813,225 B2 * 10/2010 Urano ....................... 368/47
(Continued)

FOREIGN PATENT DOCUMENTS

| CN | 101344760 A | 1/2009 |
|---|---|---|
| CN | 101359216 A | 2/2009 |

(Continued)

OTHER PUBLICATIONS

English Translation of Written Opinion of the International Searching Authority for PCT/JP2012/069624 accompanied with PCT/IB/373 and PCT/IB/338 dated Feb. 20, 2014, acting as concise explanation of previously submitted reference(s).
(Continued)

*Primary Examiner* — Vit W Miska
*Assistant Examiner* — Jason Collins
(74) *Attorney, Agent, or Firm* — Hubbs, Enatsky & Inoue PLLC

(57) ABSTRACT

Provided is a radio-controlled wristwatch, including: reception means (11) for receiving a radio wave from a satellite to extract time-of-week specifying information and week specifying information; clock means for counting a current date and time; date and time adjustment means for adjusting the current date and time counted by the clock means; week information holding means for holding the week specifying information; week information updating means for updating the week specifying information held in the week information holding means based on the current date and time counted by the clock means; and week information reception limiting means for limiting the reception of the week specifying information performed by the reception means, and controlling the reception means to receive the week specifying information in a predetermined case. Therefore, power consumption required for reception in the radio-controlled wristwatch configured to receive a radio wave containing time information from a satellite in a global positioning system is reduced.

16 Claims, 6 Drawing Sheets

(51) Int. Cl.
*G04R 20/04* (2013.01)
*G01S 19/34* (2010.01)
*G04R 20/06* (2013.01)

(56) References Cited

U.S. PATENT DOCUMENTS

| | | |
|---|---|---|
| 2009/0034372 A1 | 2/2009 | Fujisawa |
| 2009/0129206 A1* | 5/2009 | Baba ............................... 368/14 |
| 2009/0160705 A1* | 6/2009 | Matsuzaki ............... 342/357.12 |
| 2009/0180356 A1* | 7/2009 | Fujisawa ........................ 368/47 |
| 2010/0177602 A1 | 7/2010 | Abe |
| 2010/0220555 A1 | 9/2010 | Honda |
| 2011/0063952 A1* | 3/2011 | Baba ............................... 368/47 |

FOREIGN PATENT DOCUMENTS

| | | |
|---|---|---|
| CN | 101441440 A | 5/2009 |
| CN | 101488007 A | 7/2009 |
| CN | 101825866 A | 9/2010 |
| JP | 2007-271543 A | 10/2007 |
| JP | 2009-053182 A | 3/2009 |
| JP | 2009-145318 A | 7/2009 |
| JP | 2009-168620 A | 7/2009 |
| JP | 2010-203856 A | 9/2010 |

OTHER PUBLICATIONS

International Search Report of PCT/JP2012/069624 dated Aug. 28, 2012, concise explanation of relevance of JP2007-271543A, JP2009-145318A, JP2009-053182A and JP2010-203856A.
Partial transalation of the Office Action for corresponding Chinese patent application No. 201280039301.4 dated Nov. 4, 2015.

* cited by examiner

FIG.3

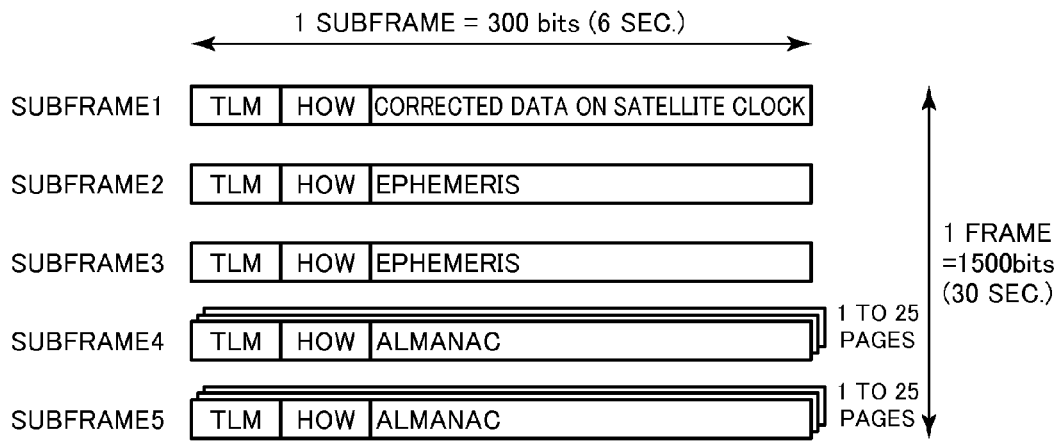

1 SUBFRAME = 300 bits (6 SEC.)

| SUBFRAME1 | TLM | HOW | CORRECTED DATA ON SATELLITE CLOCK |
| SUBFRAME2 | TLM | HOW | EPHEMERIS |
| SUBFRAME3 | TLM | HOW | EPHEMERIS |
| SUBFRAME4 | TLM | HOW | ALMANAC | 1 TO 25 PAGES |
| SUBFRAME5 | TLM | HOW | ALMANAC | 1 TO 25 PAGES |

1 FRAME =1500bits (30 SEC.)

FIG.4

SUBFRAME1

| WORD | BIT POSITION | BIT COUNT | | CONTENT |
|---|---|---|---|---|
| 1 | 1 | 22 | TLM | TELEMETRY WORD |
| 2 | 31 | 22 | HOW | HANDOVER WORD |
| 3 | 61 | 10 | WN | WEEK NUMBER |
| | 73 | 4 | URA | RANGE ACCURACY |
| | 77 | 6 | SVhealth | SATELLITE HEALTH |
| | 83 | 2 MSB | IODC | CLOCK INFORMATION NUMBER |
| 7 | 197 | 8 | TGD | GROUP DELAY |
| 8 | 211 | 8 LSB | IODC | CLOCK INFORMATION NUMBER |
| | 219 | 16 | toc | EPOCH TIME (CLOCK) |
| 9 | 241 | 8 | af2 | CLOCK CORRECTION COEFFICIENT |
| | 249 | 16 | af1 | CLOCK CORRECTION COEFFICIENT |
| 10 | 271 | 22 | af0 | CLOCK CORRECTION COEFFICIENT |

FIG.5

SUBFRAME 4, PAGE 18

| WORD | BIT POSITION | BIT COUNT | | CONTENT |
|---|---|---|---|---|
| 1 | 1 | 22 | TLM | TELEMETRY WORD |
| 2 | 31 | 22 | HOW | HANDOVER WORD |
| 3 | 63 | 6 | SV ID | PAGE ID=56 |
| | 69 | 8 | $\alpha_0$ | IONOSPHERIC CORRECTION COEFFICIENT |
| | 77 | 8 | $\alpha_1$ | IONOSPHERIC CORRECTION COEFFICIENT |
| 4 | 91 | 8 | $\alpha_2$ | IONOSPHERIC CORRECTION COEFFICIENT |
| | 99 | 8 | $\alpha_3$ | IONOSPHERIC CORRECTION COEFFICIENT |
| | 107 | 8 | $\beta_0$ | IONOSPHERIC CORRECTION COEFFICIENT |
| 5 | 121 | 8 | $\beta_1$ | IONOSPHERIC CORRECTION COEFFICIENT |
| | 129 | 8 | $\beta_2$ | IONOSPHERIC CORRECTION COEFFICIENT |
| | 137 | 8 | $\beta_3$ | IONOSPHERIC CORRECTION COEFFICIENT |
| 6 | 151 | 24 | $A_1$ | UTC PARAMETER |
| 7 | 181 | 24 MSB | $A_0$ | UTC PARAMETER |
| 8 | 211 | 8 LSB | | |
| | 219 | 8 | $T_{ot}$ | EPOCH TIME(UTC) |
| | 227 | 8 | $WN_t$ | |
| 9 | 241 | 8 | $\Delta t_{LS}$ | CURRENT LEAP SECOND |
| | 249 | 8 | $WN_{LSF}$ | UPDATE WEEK OF LEAP SECOND |
| | 257 | 8 | DN | UPDATE DAY OF LEAP SECOND |
| 10 | 271 | 8 | $\Delta t_{LSF}$ | UPDATED LEAP SECOND |

FIG.6

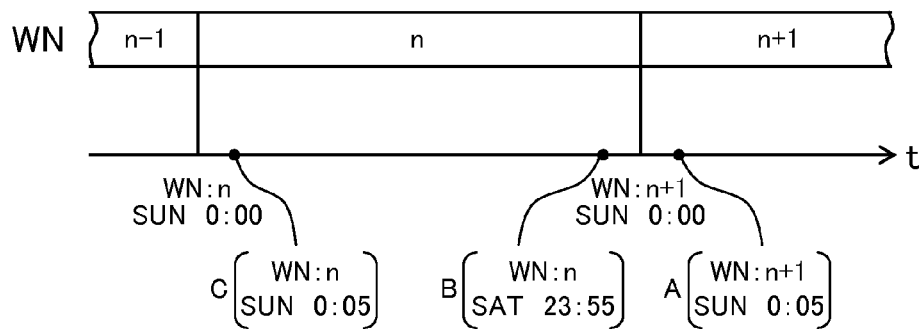

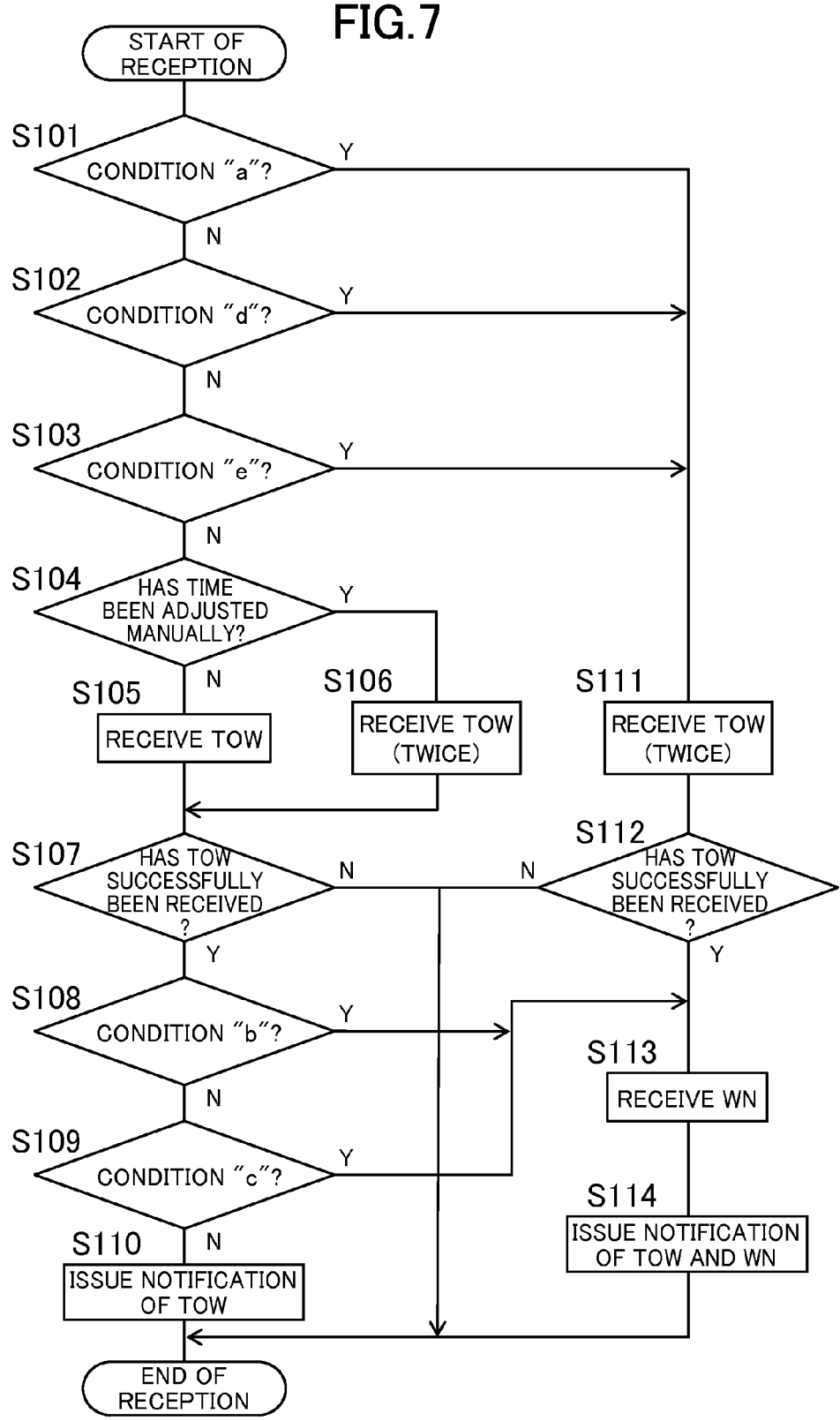

RADIO-CONTROLLED WRISTWATCH

CROSS REFERENCE TO RELATED APPLICATIONS

This application is a National Stage of International Application No. PCT/JP2012/069624 filed Aug. 1, 2012, claiming priority based on Japanese Patent Application No. 2011-176192 filed on Aug. 11, 2011. The contents of each of the above documents are incorporated herein by reference in their entirety.

TECHNICAL FIELD

The present invention relates to a radio-controlled wristwatch.

BACKGROUND ART

Also in the field of wristwatches, a so-called radio-controlled watch configured to receive an external radio wave containing time information to adjust time that is held inside the watch has become widespread in recent years. In general, the radio wave received by the radio-controlled watch is along radio wave called "standard radio wave". Such standard radio wave reception is subject to geographical restrictions, and is disadvantageous in that the reception takes time because a low-frequency carrier wave is used.

To cope with this, there is proposed a radio-controlled wristwatch configured to receive an ultra-high frequency wave used in a global positioning system as represented by the Global Positioning System (GPS). Radio wave reception from GPS satellites is free from geographical restrictions, and requires a short time owing to the use of an ultra-high frequency wave having a large information volume per unit time. As a typical example, Patent Literature 1 describes a GPS wristwatch configured to receive a satellite signal from a GPS satellite to adjust the time based on GPS time information contained in the satellite signal.

CITATION LIST

Patent Literature

[Patent Literature 1] JP 2009-168620 A

SUMMARY OF INVENTION

Technical Problem

In the GPS, date and time information includes information on a week number called "Week Number (WN)" and information on a current time in the week indicated by WN, namely time of week, called "Time Of Week (TOW; also Z count)". Then, WN is a value to be incremented by 1 at 0:00 AM every Sunday in GPS time. It is therefore necessary to know WN and TOW in order to know the accurate current time and the accurate current date based on the GPS time information.

By the way, in a satellite signal from a GPS satellite, TOW is transmitted every 6 seconds while WN is transmitted every 30 seconds. The reception of WN is thus more difficult than TOW in a radio-controlled wristwatch whose radio wave reception environment changes every second. In addition, a high frequency circuit having large power consumption needs to be activated in order to receive the satellite signal that is transmitted from the GPS satellite by means of an ultra-high frequency wave which is a high frequency signal. For the radio-controlled wristwatch, which cannot have a large-capacity power source, however, if the reception of WN is performed every time the GPS time information is received, the time required for reception, namely the activation time of the high frequency circuit, becomes longer to increase power consumption, resulting in a short continuous operation time of the radio-controlled wristwatch.

Note that, the above discussion is similarly applicable to other global positioning systems that exist at the present time or other global positioning systems to be built in the future as well as the GPS operated by the United States, in so far as time information includes week specifying information equivalent to WN and time-of-week specifying information equivalent to TOW, and the frequency of transmitting the week specifying information is lower than the frequency of transmitting the time-of-week specifying information. Thus, although the present invention is described in this specification by using WN and TOW in compliance with the GPS, WN can be read as week specifying information in other global positioning systems than the GPS, and TOW can be read as time-of-week specifying information in other global positioning systems than the GPS.

The present invention has been made in view of the foregoing circumstances, and an object to be achieved is to reduce power consumption required for reception in a radio-controlled wristwatch configured to receive a radio wave containing time information from a satellite in a global positioning system.

Solution to Problem

The invention disclosed in this application to solve the above-mentioned problem has various aspects, and the representative aspects are outlined as follows.

(1) A radio-controlled wristwatch, including: reception means for receiving a radio wave from a satellite to extract time-of-week specifying information and week specifying information; clock means for counting a current date and time; date and time adjustment means for adjusting the current date and time counted by the clock means; week information holding means for holding the week specifying information; week information updating means for updating the week specifying information held in the week information holding means based on the current date and time counted by the clock means; and week information reception limiting means for limiting the reception of the week specifying information performed by the reception means, and controlling the reception means to receive the week specifying information in a predetermined case.

(2) In the radio-controlled wristwatch according to Item (1), the week information reception limiting means is configured to control the reception means to receive the week specifying information in at least one of the following cases: a) a user has adjusted a date counted by the clock means; b) a date and time converted from the time-of-week specifying information received by the reception means or a date and time counted by the clock means falls within a predetermined range with respect to a time point at which the week specifying information is updated; c) a smaller one of differences in a forward direction and in a reverse direction between the date and time converted from the time-of-week specifying information received by the reception means and the date and time counted by the clock means extends over the time point at which the week specifying information is updated; d) the clock means has halted due to a decrease in power supply voltage; and e) the user has adjusted information indicating a number of cycles of the week specifying information.

(3) In the radio-controlled wristwatch according to Item (1) or (2), the date and time adjustment means is configured to: adjust, when the reception of the week specifying information is limited by the week information reception limiting means, a time or a date and time counted by the clock means based on the time-of-week specifying information received by the reception means and the week specifying information held in the week information holding means; and adjust, when the reception of the week specifying information is performed by the reception means under control of the week information reception limiting means, the date and time counted by the clock means based on the time-of-week specifying information received by the reception means and the week specifying information received by the reception means.

(4) In the radio-controlled wristwatch according to Item (3), when the reception of the week specifying information is limited by the week information reception limiting means and when a current day of week specified by the time-of-week specifying information received by the reception means is identical to a day of week specified by the date counted by the clock means, the date and time adjustment means adjusts only the time counted by the clock means based on the time-of-week specifying information received by the reception means.

(5) In the radio-controlled wristwatch according to any one of Items (1) to (4), in a case where the reception means is controlled by the week information reception limiting means to attempt to receive the week specifying information and where the reception means has succeeded in receiving the time-of-week specifying information but failed to receive the week specifying information: the date and time adjustment means adjusts a time counted by the clock means based on the time-of-week specifying information received by the reception means when a current day of week specified by the time-of-week specifying information received by the reception means is identical to a day of week specified by the date counted by the clock means; and the date and time adjustment means is controlled not to adjust the date and time counted by the clock means when the current day of week specified by the time-of-week specifying information received by the reception means is different from the day of week specified by the date counted by the clock means.

(6) In the radio-controlled wristwatch according to any one of Items (1) to (5), in a case where a date counted by the clock means is adjusted by a user or where the week specifying information held in the week information holding means is unreliable, the reception means is controlled to receive the time-of-week specifying information a plurality of times, and, when the obtained plurality of pieces of the time-of-week specifying information have consistency, the date and time adjustment means adjusts a time or a date and time counted by the clock means based on the obtained plurality of pieces of the time-of-week specifying information.

(7) In the radio-controlled wristwatch according to any one of Items (1) to (6), when the reception by the reception means is performed based on information indicating an ambient environment of the radio-controlled wristwatch, the week information reception limiting means limits the reception of the week specifying information performed by the reception means.

Advantageous Effects of Invention

According to any one of the aspects (1) to (4), power consumption required for reception can be reduced in the radio-controlled wristwatch configured to receive a radio wave containing time information from a satellite in a global positioning system.

According to the aspect (5), erroneous adjustment in the case where the result of reception is unreliable can be prevented.

According to the aspect (6) or (7), the possibility of erroneous adjustment due to erroneous reception can be reduced.

BRIEF DESCRIPTION OF DRAWINGS

FIG. 3 is a schematic diagram illustrating the structure of subframes of a signal transmitted from a GPS satellite.

FIG. 4 is a table showing the structure of subframe 1.

FIG. 5 is a table showing the structure of page 18 of subframe 4.

FIG. 6 is a diagram for describing the reason why the date becomes incorrect when the date and time is adjusted based on reception of TOW alone.

FIG. 7 is a flowchart illustrating an operation of a reception control unit.

DESCRIPTION OF EMBODIMENT

Figure 1:
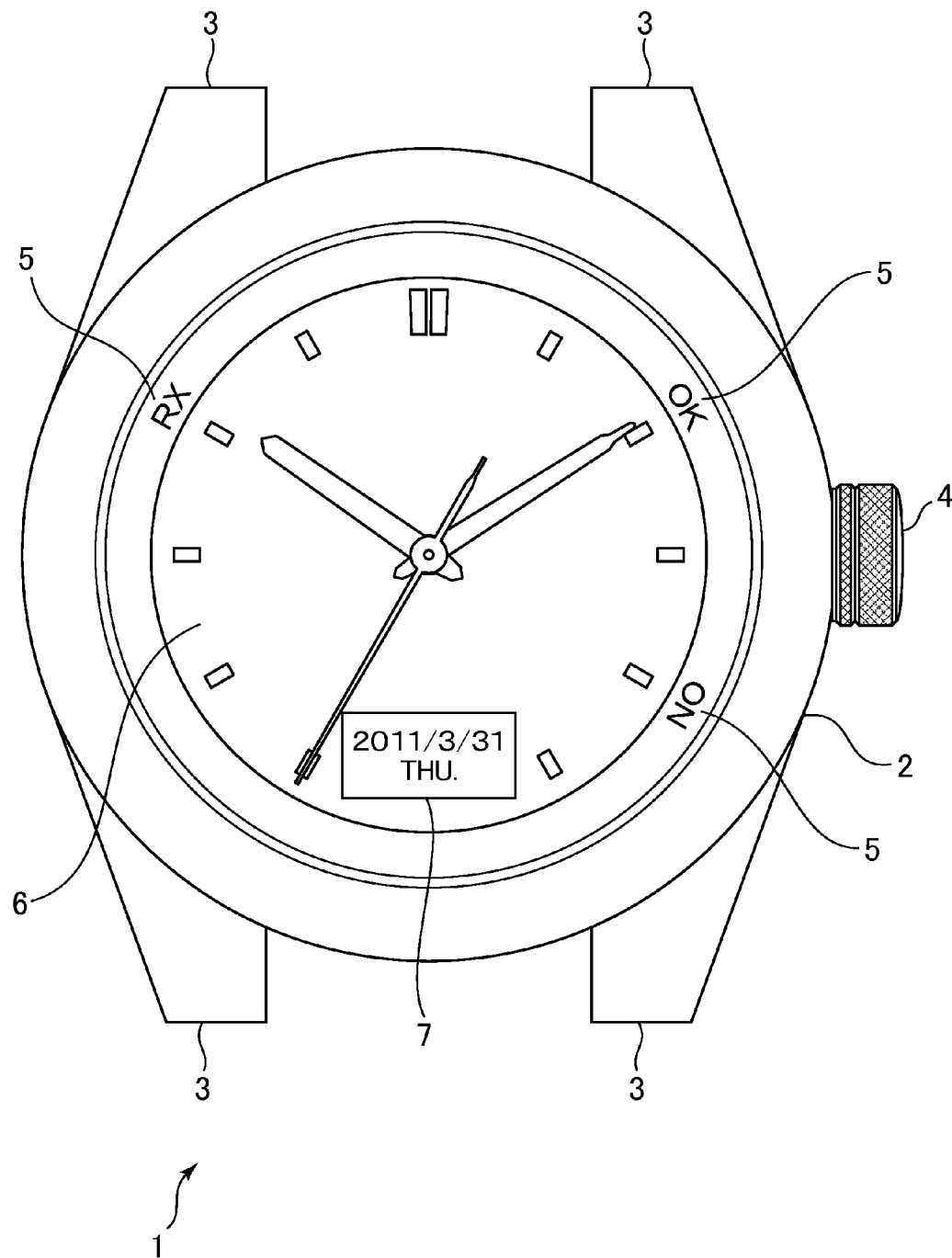
FIG. 1 is a plan view illustrating a radio-controlled wristwatch according to an embodiment of the present invention.

FIG. 1 is a plan view illustrating a radio-controlled wristwatch 1 according to an embodiment of the present invention. As used herein, the radio-controlled wristwatch refers to a wristwatch and a radio-controlled watch.

In FIG. 1, reference numeral 2 denotes an exterior case, and band attachment portions 3 are provided to be opposed in the 12 o'clock direction and the 6 o'clock direction. Further, an operating member 4 is provided on a side surface of the radio-controlled wristwatch 1 on the 3 o'clock side. Note that, in FIG. 1, the 12 o'clock direction of the radio-controlled wristwatch 1 is an upward direction of FIG. 1, and the 6 o'clock direction is a downward direction of FIG. 1.

The radio-controlled wristwatch 1 uses a hand mechanism as illustrated in FIG. 1, in which an hour hand, a minute hand, and a second hand are coaxially provided, with the central position of the radio-controlled wristwatch 1 as the rotation center. Note that, although the second hand in this embodiment is coaxial with the hour hand and the minute hand, the second hand may be replaced with a so-called chronograph hand and the second hand may be arranged at an arbitrary position as a secondary hand as exemplified by a chronograph watch. Then, indications 5 for notifying a user of reception conditions are marked or printed on the exterior case 2 at positions outside a watch face 6. The second hand indicates any one of the indications 5 during or around the reception of a radio wave containing time information from an artificial satellite of a global positioning system, the GPS in this embodiment. Further, a digital display unit 7 is provided at the 6 o'clock position of the watch face 6 to enable date and day-of-week display to be visually recognized. In this embodiment, the digital display unit 7 is a liquid crystal display device, and is capable of displaying various kinds of information in addition to the illustrated year, month, day, and day of week. However, the display described herein is merely an example. Instead of using the digital display unit 7, appropriate analog display, for example, date display or day-ofweek display using a day dial or another rotating disk and various kinds of display using a secondary hand, may be used. In any case, the radio-controlled wristwatch 1 internally holds at least information on the current date as well as the current time. The operating member 4, which is a crown in FIG. 1, may be replaced with or additionally provided with another mechanism such as a push button, and can be arranged at any position.

The radio-controlled wristwatch 1 according to this embodiment further includes a patch antenna serving as a high frequency receiving antenna on the rear side of the watch face 6 at a position on the 9 o'clock side. Note that, the form of the antenna may be determined in accordance with the radio wave to be received, and an antenna of another form such as an inverted-F antenna may be used.

Figure 2:
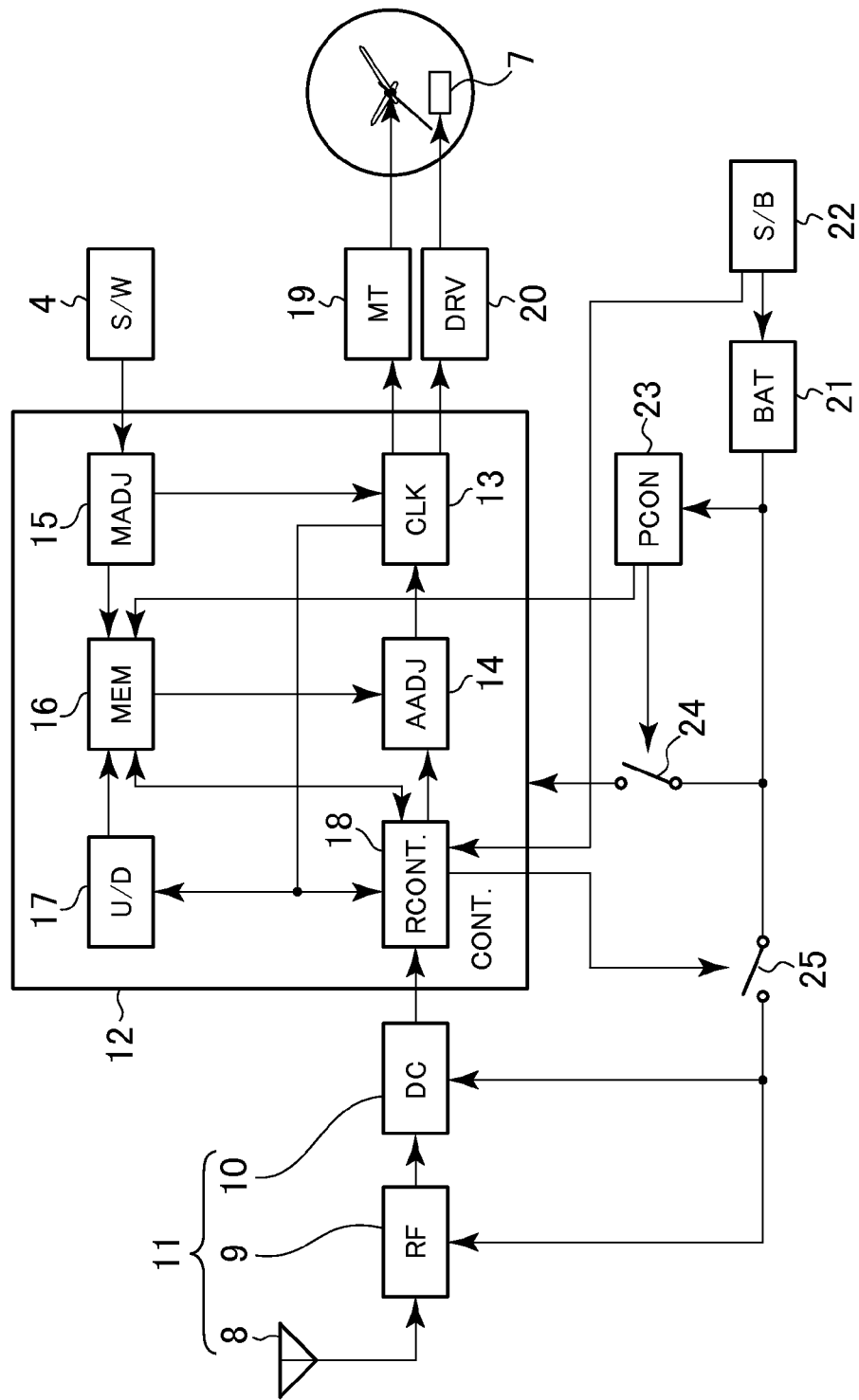
FIG. 2 is a functional block diagram of the radio-controlled wristwatch according to the embodiment of the present invention.

FIG. 2 is a functional block diagram of the radio-controlled wristwatch 1 according to this embodiment. A radio wave from a GPS satellite is received by an antenna 8 and converted into a base band signal by a high frequency circuit 9. From the base band signal, a decoder circuit 10 extracts TOW and WN as information relating to the time, or, if necessary, $\Delta t_{LS}$ as information relating to the current leap second. The extracted information is transferred to a controller 12. In other words, the antenna 8, the high frequency circuit 9, and the decoder circuit 10 construct a reception unit 11 serving as reception means for receiving a radio wave from a satellite and extracting TOW as time-of-week specifying information and WN as week specifying information.

The controller 12 is a microcomputer for controlling the overall operation of the radio-controlled wristwatch 1, and contains various kinds of circuits for implementing various functions of the radio-controlled wristwatch 1. In the following, a description is given of the circuits contained in the controller 12 by focusing on their functions. Note that, all the following circuits are not necessarily required to be implemented as physical electric circuits, but all or a part of the functions may be implemented by software executed on the controller 12. In addition, all the functions of the controller 12 are not necessarily required to be implemented on a single integrated circuit chip, but the controller 12 itself may be constructed by a plurality of integrated circuit chips and peripheral circuits.

A clock circuit 13, serving as clock means for counting the current date and time, counts the internal time and date. The accuracy of the clock circuit 13 is about ±15 seconds per month although varying depending on the accuracy of a crystal oscillator to be used or the use environment such as temperature. It should be understood that the accuracy of the clock circuit 13 can be set arbitrarily as necessary.

An automatic date and time adjustment unit 14, serving as date and time adjustment means for adjusting the current date and time counted by the clock means, is a circuit for adjusting the current date and time counted by the clock circuit 13 based on TOW and WN or $\Delta t_{LS}$ received by the reception unit 11.

A manual adjustment unit 15 is a circuit for adjusting the current date and time counted by the clock circuit 13 in accordance with the user's operation of the operating member 4 or rewriting WNmem or a cycle count that are information stored in a memory unit 16 to be described below.

The memory unit 16 is an information storage for storing various kinds of information necessary for the controller 12. The memory unit 16 in this embodiment stores at least WNmem, which is information specifying a week to which the date and time counted by the clock circuit 13 belongs, the cycle count, which is the number of cycles of WN, a time adjustment flag, a date adjustment flag, and a cycle count adjustment flag respectively indicating that the user (namely, the manual adjustment unit 15) has adjusted the time, adjusted the date, and adjusted the cycle count, a P/B flag indicating that the clock circuit 13 has halted (power break) due to a decrease in power supply voltage, and $\Delta t_{LS}$, which is the current leap second. WNmem as used herein is information corresponding to WN contained in the radio wave from the GPS satellite. The memory unit 16, however, does not simply store the received WN as it is, but stores WN that is expected to be obtained if the radio wave is received from the GPS satellite at the current date and time counted by the clock circuit 13. Thus, WNmem is updated in accordance with the update of the date and time counted by the clock circuit 13, and this update is unrelated to whether or not the reception unit 11 has received the radio wave from the GPS satellite. WNmem is updated by an update unit 17 to be described later. Thus, in terms of storing WNmem, the memory unit 16 functions as week information holding means for holding the week specifying information. Note that, the memory unit 16 is physically a semiconductor memory element, preferably a non-volatile memory such as an electrically erasable programmable read only memory (EEPROM). However, all parts of the memory unit 16 are not necessarily required to be non-volatile memories, but a part of the memory unit 16 may be a volatile random access memory (RAM). Alternatively, information may be multiplexed in entirety or in part in such a manner that a volatile memory is backed up by a non-volatile memory.

Note that, the "date" as used herein refers to information relating to a day on a calendar, and includes not only a so-called day but also a year, a month, and a day of week. Then, the "date adjustment" refers to the state in which any of the pieces of information relating to a day on a calendar has been adjusted or is made adjustable. As used herein, the state in which the date is made adjustable means that the user has operated the operating member 4 of the radio-controlled wristwatch 1 to switch the operating state of the radio-controlled wristwatch 1 from the normal state of displaying the date and time to the state in which the date is adjustable. Further, the "time" refers to time-related information including the hour, minute, and second but excluding the date. Then, the "time adjustment" refers to the state in which any of the pieces of time-related information excluding the date has been adjusted or is made adjustable. As used herein, the state in which the time is made adjustable means that the user has operated the operating member 4 of the radio-controlled wristwatch 1 to switch the operating state of the radio-controlled wristwatch 1 from the normal state of displaying the date and time to the state in which the time is adjustable.

How to switch the state of the radio-controlled wristwatch 1 in response to the user's operation of the operating member 4 is optional, and can be set as appropriate. For example, the state of the radio-controlled wristwatch 1 may be switched from the normal state of displaying the date and time to the time adjustable state and to the date adjustable state independently in response to appropriate operations and then resumed. Alternatively, the state of the radio-controlled wristwatch 1 may be switched from the normal state of displaying the date and time to a so-called adjustment mode of adjusting the time and the date. In this case, the normal state of displaying the date and time is first switched to the time adjustable state in response to a user's operation, and then resumed to the normal state of displaying the date and time or switched to the date adjustable state in response to another user's operation. In the former case, it is regarded that only the time has been adjusted, and in the latter case, the time and the date have been adjusted.

The update unit 17 is a circuit for updating WNmem and the cycle count stored in the memory unit 16. The operation of the update unit 17 is as follows. Specifically, the update unit 17 increments WNmem by 1 at the timing at which the current date and time counted by the clock circuit 13 passes 0:00 AM every Sunday. Further, when an overflow occurs in WNmem as a result of the increment, the update unit 17 increments the cycle count by 1. Therefore, in terms of updating WNmem, the update unit 17 functions as week information updating means for updating the week specifying information held in the week information holding means based on the current date and time counted by the clock means.

Then, a reception control unit 18 is a circuit for controlling the reception unit 11 to obtain a desired signal by switching ON/OFF of the operation of the reception unit 11 based on the clock circuit 13 and on the information stored in the memory unit 16, the information received by the reception unit 11, and the like. In this embodiment, the reception control unit 18 normally controls the reception unit 11 to receive only TOW. The reason is that, as described above, once WN has been successfully received, WNmem stored in the memory unit 16 is updated by the update unit 17 every week without particularly receiving WN thereafter and hence the updated WNmem can be used as WN to eliminate the need of receiving WN. Then, the reception of TOW alone requires a maximum of 6 seconds per reception, and hence, by omitting the reception of WN that requires a maximum of 30 seconds per reception, power consumption of the radio-controlled wristwatch 1 is expected to be reduced. However, when the date and time is adjusted based on the reception of TOW alone, the date may become inaccurate as described later depending on the reception timing of TOW and the state of the radio-controlled wristwatch 1 at that timing. Further, also in the state in which WNmem itself is unreliable, the date cannot be made accurate. To address the problems, the reception control unit 18 controls the reception unit 11 to receive WN in a predetermined case, specifically, when the date may become inaccurate if the date and time is corrected based on the reception of TOW alone or when WNmem is unreliable. Therefore, in terms of permitting or inhibiting the reception of WN performed by the reception unit 11, the reception control unit 18 functions as week information reception limiting means for limiting the reception of the week specifying information performed by the reception means and controlling the reception means to receive the week specifying information in a predetermined case.

The clock circuit 13 of the controller 12 outputs a signal for driving a motor 19 based on the date and time counted inside the clock circuit 13, to thereby drive the hands to display the time. The clock circuit 13 further outputs to a driver 20 a signal for displaying information to be displayed on the digital display unit 7, such as the current year, month, day, and day of week. Then, necessary information is displayed on the digital display unit 7.

The radio-controlled wristwatch 1 according to this embodiment further includes a secondary battery 21 as its power supply. The secondary battery 21 accumulates electric power obtained by power generation of a solar battery 22 placed on or under the watch face 6 (see FIG. 1). Then, the secondary battery 21 supplies electric power to the high frequency circuit 9, the decoder circuit 10, and the controller 12.

A power supply circuit 23 monitors an output voltage of the secondary battery 21. When the output voltage of the secondary battery 21 decreases to be lower than a predetermined threshold, the power supply circuit 23 turns off a switch 24 to stop the supply of power to the controller 12. In response thereto, the supply of power to the clock circuit 13 is also stopped. Thus, when the switch 24 is turned off, the internal time counted by the clock circuit 13 is lost (this state is referred to as "power break"). Further, when the output voltage of the secondary battery 21 is recovered due to the power generation of the solar battery 22 or the like, the power supply circuit 23 turns on the switch 24 to supply power to the controller 12, to thereby recover the functions of the radio-controlled wristwatch 1. In this case, the power supply circuit 23 sets the P/B flag stored in the memory unit 16 to record that the power break has occurred.

A switch 25 is a switch for switching on/off of the supply of electric power to the high frequency circuit 9 and the decoder circuit 10, and is controlled by the reception control unit 18. The high frequency circuit 9 and the decoder circuit 10, which operate at a high frequency, are large in power consumption, and hence the reception control unit 18 turns on the switch 25 to operate the high frequency circuit 9 and the decoder circuit 10 only when the radio wave is received from the satellite, and otherwise turns off the switch 25 to reduce power consumption. Note that, information indicating generated energy of the solar battery 22 is input from the solar battery 22 to the reception control unit 18, but this configuration may be omitted if unnecessary.

The reception unit 11 may be configured to receive the radio wave from the satellite, for example, when a request is issued from a user via input means such as the operating member 4, when a predetermined time has come, based on an elapsed time from the time at which the previous time adjustment was made, or based on information indicating the generated energy of the solar battery 22 or other information indicating an ambient environment of the radio-controlled wristwatch 1. Note that, the reception performed in response to a request from the user is referred to as "forced reception", the reception performed based on other time information when a predetermined time has come is referred to as "regular reception", and the reception performed based on the information indicating the ambient environment of the radio-controlled wristwatch 1 is referred to as "environmental reception".

Subsequently, a description is given of a signal from a GPS satellite received by the radio-controlled wristwatch 1 according to this embodiment. The signal transmitted from the GPS satellite has a carrier frequency of 1,575.42 MHz called "L1 band". The signal is encoded by a C/A code specific to each GPS satellite modulated by binary phase shift keying (BPSK) at a period of 1.023 MHz, and is multiplexed by a so-called code division multiple access (CDMA) method. The C/A code itself has a 1,023-bit length, and message data on the signal changes every 20 C/A codes. In other words, 1-bit information is transmitted as a signal of 20 ms.

The signal transmitted from the GPS satellite is divided into frames having a unit of 1,500 bits, namely 30 seconds, and each frame is further divided into five subframes. FIG. 3 is a schematic diagram illustrating the structure of subframes of the signal transmitted from the GPS satellite. Each subframe is a signal of 6 seconds containing 300-bit information. The subframes are numbered 1 to 5 in order. The GPS satellite transmits the subframes sequentially starting from subframe 1. When finishing the transmission of subframe 5, the GPS satellite returns to the transmission of subframe 1 again, and repeats the same process thereafter.

At the head of each subframe, a telemetry word represented by TLM is transmitted. TLM contains a code indicating the head of each subframe, and information on a ground control station. Subsequently, a handover word represented by HOW is transmitted. HOW contains TOW as information specifying the time of week, also called "Z count". TOW is a 6-second-unit time counted from 0:00 AM on Sunday, and indicates a time at which the next subframe is started.

Information following HOW differs depending on the subframe, and subframe 1 includes corrected data of a satellite clock. FIG. 4 is a table showing the structure of subframe 1. Subframe 1 includes a week number represented by WN following HOW. WN is a numerical value indicating a current week counted by assuming Jan. 6, 1980 as a week 0. Accordingly, by receiving both WN and TOW, accurate day and time can be obtained. Note that, time information in the GPS is counted starting from 0:00 AM, Jan. 6, 1980 as described above, and hence the leap second is not taken into consideration at all. Thus, GPS time deviates from coordinated universal time (UTC) by accumulated leap seconds to be irregularly inserted. In this specification, the time used in the GPS is referred to as "GPS time".

Note that, as described above, WN is 10-bit information and hence is returned to 0 again when 1,024 weeks has elapsed. Thus, in order to obtain UTC from GPS time, it is necessary to know the number of cycles of WN additionally. Further, the signal from the GPS satellite contains other various kinds of information, but information not directly relating to the present invention is merely shown and its description is omitted.

Referring to FIG. 3 again, subframe 2 and subframe 3 contain orbit information on each satellite called "ephemeris" following HOW, but its description is herein omitted. In addition, subframes 4 and 5 contain general orbit information for all the GPS satellites called "almanac" following HOW. The information contained in subframes 4 and 5, which has a large information volume, is transmitted after being divided into units called "pages". Then, the data transmitted in each of subframes 4 and 5 is divided into pages 1 to 25, and contents of the pages that differ depending on the frames are transmitted in order. Accordingly, 25 frames, that is, 12.5 minutes is required to transmit the contents of all the pages.

FIG. 5 shows a table showing the structure of page 18 of subframe 4. As shown in FIG. 5, the 241st bit in page 18 of subframe 4 contains a current leap second $\Delta t_{LS}$ as information on the current leap second. $\Delta t_{LS}$ represents a deviation between UTC and GPS time in the form of seconds. UTC can be determined by adding $\Delta t_{LS}$ to GPS time.

As is apparent from the above description, TOW is contained in all the subframes and can therefore be acquired every 6 seconds. On the other hand, WN is contained in subframe 1 and can therefore be acquired only every 30 seconds, and $\Delta t_{LS}$ is transmitted only once every 25 frames and can therefore be acquired only every 12.5 minutes.

Note that, the clock circuit 13 (see FIG. 2) of the radio-controlled wristwatch 1 may count the date and time in GPS time, in UTC, or in standard time in a particular region. In any case, the radio-controlled wristwatch 1 converts the date and time into GPS time before use when receiving the radio wave from the satellite, and converts the date and time into standard time before use when displaying the date and time to a user. In this embodiment, the radio-controlled wristwatch 1 holds the internal date and time in the form of UTC. In other words, to describe with reference to FIG. 2, the clock circuit 13 counts the date and time in the form of UTC. On the other hand, TOW and WN obtained by the reception unit 11 are based on GPS time, and hence the automatic date and time adjustment unit 14 converts the date and time obtained from the reception control unit 18 into UTC, that is, adds $\Delta t_{LS}$ stored in the memory unit 16 to adjust the date and time counted by the clock circuit 13. Further, in this embodiment, WNmem stored in the memory unit 16 is based on GPS time, and hence the update unit 17 converts the current date and time determined based on UTC obtained from the clock circuit 13 into GPS time and thereafter updates WNmem and the cycle count stored in the memory unit 16. Then, when outputting the date and time to the motor 19 and the driver 20, the clock circuit 13 converts UTC into standard time by taking a time difference into consideration.

Note that, WNmem stored in the memory unit 16 is not necessarily required to be based on GPS time, but may be based on the same standard (UTC in this embodiment) as the date and time counted by the clock circuit 13. In this case, when WNmem is updated, it is not necessary for the update unit 17 to convert the date and time obtained from the clock circuit 13. On the other hand, when WNmem is based on another standard than GPS time, a deviation occurs between the update timing of WN and the update timing of WNmem. For example, when WNmem is based on UTC, a deviation occurs by the leap second $\Delta t_{LS}$. A conceivable method for preventing the occurrence of erroneous updating due to the deviation when WNmem is updated based on the received WN is that, for example, the reception control unit 18 limits the reception of WN performed by the reception unit 11 in a period during which WN and WNmem may deviate from each other. When WNmem is based on UTC as shown in the above example, the reception of WN is inhibited for, for example, a predetermined period of about several ten seconds to about several minutes around 0:00 AM on Sunday in the date and time obtained from the clock circuit 13 (date and time based on UTC) as a corresponding period in which a deviation may occur practically due to the leap second $\Delta t_{LS}$. Specifically, the predetermined period is, for example, 19 seconds before and 71 seconds after 0:00 AM on Sunday in UTC. In this case, the reason why the period in the forward direction from 0:00 AM on Sunday in UTC is longer than the period in the reverse direction is that UTC is generally considered to be delayed from GPS time. Alternatively, WNmem may be updated in a manner that the date and time obtained from the received WN and TOW is converted into time serving as a reference of WNmem. In this case, for example, in the case where the reference of WNmem is UTC, when the received TOW falls within the range of $\Delta t_{LS}$ from 0:00 AM on Sunday in GPS time, WNmem is updated by the value obtained by subtracting 1 from the received WN. In the case where the reference of WNmem is standard time, WNmem is updated by further taking a time difference from UTC into consideration.

Subsequently, the reason why the date becomes inaccurate when the date and time is adjusted based on the reception of TOW alone is described with reference to FIG. 6. FIG. 6 shows the flow of time t, in which the right direction indicated by the t axis is the advance direction of time. In the following, in this specification, the advance direction of time is referred to as "forward direction" and the direction in reverse chronological order is referred to as "reverse direction". Then, the week partitioned by WN is indicated on the upper side of the t axis. In FIG. 6, the week whose WN is n−1, the week whose WN is n, and the week whose WN is n+1 are shown. Then, each week starts from 0:00 AM on Sunday. In FIG. 6, the starting points of the week whose WN is n and the week whose WN is n+1 are written on the t axis . Note that, the starting points of the weeks are also the time points at which WN is updated. Note that, as is apparent, the time t of FIG. 6 is based on GPS time.

Now, it is assumed that the date and time counted by the clock circuit 13 of the radio-controlled wristwatch 1 is delayed for some reason by 10 minutes from accurate date and time. Then, when the accurate current date and time is 0:05 AM on Sunday in the week whose WN is n+1 (point A of FIG. 6), the date and time counted by the clock circuit 13 is 11:55 PM on Saturday in the week whose WN is n (point B of FIG. 6). In this case, the value of WNmem stored in the memory unit 16 is not updated yet and therefore n.

If only TOW is received by the reception unit 11 at this timing, the time of week obtained by the received TOW is 0:05 AM on Sunday. Then, if the date and time is adjusted based on the obtained time of week and the value of WNmem stored in the memory unit 16, the date and time is adjusted to 0:05 AM on Sunday in the week whose WN is n (point C of FIG. 6) because WNmem has not been updated. As a result, the indicated date and time is just 1 week before the point A of the accurate current date and time. In other words, the date and time becomes inaccurate.

A similar phenomenon may occur also in the case where the date and time counted by the clock circuit 13 is advanced from accurate date and time. To specifically describe with reference to FIG. 6, if only TOW is received to perform time adjustment at the timing at which the accurate current date and time is a point B of FIG. 6 and the date and time counted by the clock circuit 13 is the point A of FIG. 6, the indicated date and time is just 1 week after the point B of the accurate current date and time.

In short, those phenomena occur when the time adjustment is performed based only on TOW at the timing at which the value of WNmem stored in the memory unit 16 is different from the proper value of WN at the accurate current date and time. As described above, the situation where the value of WNmem and the proper value of WN are different from each other occurs when there is a difference between the date and time counted by the clock circuit 13 and the accurate current date and time and when only one of the date and time counted by the clock circuit 13 and the accurate current date and time has passed a time point at which WN is updated in the period during which the difference occurs. In addition, it can be determined based on various other kinds of conditions that the value of WNmem and the proper value of WN are or may be different from each other.

To address the problem, in the radio-controlled wristwatch 1 according to this embodiment, the reception control unit 18 discriminates various cases where the value of WNmem and the proper value of WN are or may be different from each other, and, when determining that those values are or may be different from each other, controls the reception unit 11 to receive WN in addition to TOW, to thereby prevent the date from becoming inaccurate.

The case where the reception control unit 18 determines that the value of WNmem and the proper value of WN are or may be different from each other is the case where any one of the following various kinds of conditions is satisfied. Note that, not all the conditions described herein are required to be used, but at least one condition may be used as necessary. It should be understood that all the conditions may be used.

Condition a: the user has adjusted the date counted by the clock circuit 13

When this condition is satisfied, how the user has adjusted the date is unknown, and hence there is no guarantee that the value of WNmem based on the adjusted date is proper. Thus, WN needs to be received in the next reception. This discrimination is made by referring to the date adjustment flag stored in the memory unit 16.

Condition b: the date and time converted from TOW received by the reception unit 11 or the date and time counted by the clock circuit 13 falls within a predetermined range with respect to the time point at which WN is updated Satisfying this condition means that at least one of the current date and time obtained from TOW and the internal date and time counted by the clock circuit 13 is close to 0:00 AM on Sunday, which is the time point at which WN is updated. In such a case, the value of WNmem and the proper value of WN may be different from each other, and hence WN needs to be received. Note that, the predetermined range with respect to the time point at which WN is updated may be determined as appropriate by taking the practical convenience into consideration. For example, the predetermined range may be a range of 1 hour before and after the time point at which WN is updated (in other words, 2 hours from 11:00 PM on Saturday to 1:00 AM on Sunday), and may be a range of 24 hours in the forward direction or reverse direction starting from the time point at which WN is updated (in other words, Sunday or Saturday). When the range is increased, the possibility that the date becomes inaccurate is reduced, but the receiving frequency of WN is increased to increase power consumption.

Condition c: a smaller one of differences in the forward direction and in the reverse direction between the date and time converted from TOW received by the reception unit 11 and the date and time counted by the clock circuit 13 extends over the time point at which WN is updated.

This means the case where there is a difference between the accurate current time and the time counted by the clock circuit 13 and the difference extends over the time point at which WN is updated as shown in FIG. 6. The "difference extends over a certain time point" as used herein refers to the case where a certain time point is included in a period between two different dates and times, that is, in the difference. By the way, a day of week and a time can be obtained from the time of week obtained from TOW, but a specific date cannot be obtained. Thus, a time relationship between the date and time converted from TOW and the date and time counted by the clock circuit 13 cannot be grasped. Thus, two kinds of differences are obtained as the difference between two dates and times, specifically, a difference assuming that the date and time converted from TOW is located in the forward direction with respect to the date and time counted by the clock circuit 13 and a difference assuming that the date and time converted from TOW is located in the reverse direction. Now, the former is referred to as "difference in the forward direction" and the latter is referred to as "difference in the reverse direction". In this case, the error of the clock circuit 13 is generally about ±15 seconds per month at most as described above, and this error does not become as long as several days. Further, even when the time is manually adjusted by the user, the time adjustment range is within a range of ±24 hours. Thus, a smaller one of the difference in the forward direction and the difference in the reverse direction is considered as the difference between the actual date and time converted from TOW and the date and time counted by the clock circuit 13. Thus, in the case where the difference extends over the time point at which WN is updated, the value of WNmem and the proper value of WN are different from each other. Thus, WN needs to be received in this case.

Condition d: the clock circuit 13 has halted due to a decrease in power supply voltage This means the case where the above-mentioned power break has occurred by the power supply circuit 23. When this condition is satisfied, there is a period during which the clock circuit 13 has halted, and WNmem is not updated in this period, and hence the value of WNmem is obviously unreliable. Thus, WN needs to be received in the next reception. This discrimination is made by referring to the P/B flag stored in the memory unit 16.

Condition e: the user has adjusted the cycle count

When this condition is satisfied, it is not always necessary to adjust WN, but, when the cycle count is adjusted, the date displayed on the radio-controlled wristwatch 1 is greatly changed, and hence it cannot be expected that the date counted by the clock circuit 13 is accurate. Thus, WN is to be received in the next reception also in this case. This discrimination is made by referring to the cycle count adjustment flag stored in the memory unit 16.

FIG. 7 is a flowchart illustrating the operation of the reception control unit 18.

When a reception operation is started, the reception control unit 18 first determines in Step S101 whether or not the above-mentioned condition "a" is satisfied. When the result is affirmative, that is, when the user has adjusted the date counted by the clock circuit 13, the processing proceeds to Step S111, and otherwise proceeds to Step S102. In Step S102, the reception control unit 18 determines whether or not the above-mentioned condition "d" is satisfied. When the result is affirmative, that is, when the clock circuit 13 has halted due to a decrease in power supply voltage, the processing proceeds to Step S111 as well, and otherwise proceeds to Step S103. Further, in Step S103, the reception control unit 18 determines whether or not the above-mentioned condition "e" is satisfied. When the result is affirmative, that is, when the user has adjusted the cycle count, the processing similarly proceeds to Step S111, and otherwise proceeds to Step S104.

In Step S104, the reception control unit 18 determines whether or not the user has adjusted the time counted by the clock circuit 13. This discrimination is made by referring to the time adjustment flag stored in the memory unit 16. Then, when the result is negative, that is, when the user has not adjusted the time, the processing proceeds to Step S105, and the reception control unit 18 controls the reception unit 11 to receive TOW. Note that, this reception is considered to be successful once the TOW is received, and requires a maximum of 6 seconds. On the other hand, when the result of Step S104 is affirmative, that is, when the user has adjusted the time, the processing proceeds to Step S106. Also in Step S106, the reception control unit 18 controls the reception unit 11 to receive TOW. This reception, however, is considered be successful when the TOW is received twice and the two TOW have consistency (in other words, TOW received later indicates time 6 seconds after TOW received earlier), and requires a maximum of 12 seconds. Note that, the number of receptions of TOW in Step S106 may be set to any plurality of numbers, specifically, at least three. In this case, it is determined whether or not the obtained plurality of TOW have consistency. Whichever of Step S105 and Step S106 is executed, the processing proceeds to the subsequent Step S107.

As described above, Steps S104 to S106 are similarly the processing of receiving TOW, but the reason why the number of receptions is varied depending on the presence/absence of time adjustment by the user is that a deviation from the accurate time is expected to be larger when the time has been adjusted by the user and hence the number of receptions is increased to ensure the accuracy of information to be obtained. However, this control is not always necessary, and the number of receptions of TOW may be set to a fixed number, for example, one regardless of the presence/absence of time adjustment by the user. In this case, Steps S104 and S106 of FIG. 7 are omitted. Alternatively, the number of receptions of TOW may be uniformly set to two or more.

In Step S107, the reception control unit 18 determines whether or not TOW has successfully been received in the previous Step S105 or S106. When TOW has successfully been received, the processing proceeds to the subsequent Step S108. When the reception of TOW has failed, the reception operation this time is considered as "reception failed", and the processing is finished. In this case, the failure of the reception may be notified to the user by some means.

In Step S108, the reception control unit 18 determines whether or not the above-mentioned condition "b" is satisfied. When the result is affirmative, that is, when the date and time converted from TOW received by the reception unit 11 or the date and time counted by the clock circuit 13 falls within a predetermined range with respect to the time point at which WN is updated, the processing proceeds to Step S113, and otherwise proceeds to Step S109.

In Step S109, the reception control unit 18 determines whether or not the above-mentioned condition "c" is satisfied. When the result is affirmative, that is, when a smaller one of differences in the forward direction and in the reverse direction between the date and time converted from TOW received by the reception unit 11 and the date and time counted by the clock circuit 13 extends over the time point at which WN is updated, the processing proceeds to Step S113 as well, and otherwise proceeds to Step S110.

Note that, the condition "b" used for the determination in Step S108 and the condition "c" used for the determination in Step S109 are close in content. Thus, although both the condition "b" and the condition "c" are used for the determination in this embodiment, only one of the condition "b" and the condition "c" may be used.

Step S110 is executed when all the conditions "a" to "e" are all negative and when TOW has successfully been received. In Step S110, only TOW is notified to the automatic date and time adjustment unit 14. As described later, the automatic date and time adjustment unit 14 adjusts the date and time or the time based on the notified TOW. Then, after the execution of Step S110, the reception control unit 18 finishes the reception operation. In other words, in the state in which Step S110 is executed, the reception unit 11 is controlled by the reception control unit 18 not to receive WN.

On the other hand, when the results of determination in Steps S101, S102, and S103 are affirmative, the processing proceeds to Step S111, and the reception control unit 18 controls the reception unit 11 to receive TOW. Similarly to the reception executed in Step S106, this reception is executed to receive TOW twice, and, when the two TOW have consistency (in other words, TOW received later indicates time 6 seconds after TOW received earlier), the reception is considered be successful. This reception requires a maximum of 12 seconds. This means that WNmem is unreliable when the condition "a", the condition "d", and the condition "e" are satisfied. In such a case, the current time counted by the clock circuit 13 is expected to be also unreliable. Thus, the number of receptions is increased to ensure the accuracy of information to be obtained. However, this control is not always necessary, and the number of receptions of TOW may be set to one. Alternatively, the number of receptions of TOW may be set to any plurality of numbers, specifically, at least three. In this case, it is determined whether or not the obtained plurality of TOW have consistency.

In Step S112, it is determined whether TOW has successfully been received in the previous Step S111. When TOW has successfully been received, the processing proceeds to the subsequent Step S113. When the reception of TOW has failed, the reception operation this time is considered as "reception failed", and the processing is finished. In this case, the failure of the reception may be notified to the user by some means.

In Step S113, the reception control unit 18 controls the reception unit 11 to receive WN. This reception requires a maximum of 30 seconds as described above. Step S113 is executed when TOW has successfully been received in the previous Step S112 or when the results of determination in Steps S108 and S109 are affirmative. In other words, Step S113 is executed to attempt to receive WN when any one of the conditions "a" to "e" used in the flow illustrated in FIG. 7 is affirmative and when TOW has successfully been received. Irrespective of whether the reception of WN has succeeded or failed, the processing proceeds to the subsequent Step S114. Note that, the reception of WN may be attempted once as described here to finish the reception processing and the processing may proceed to Step S114. Alternatively, similarly to the processing performed on TOW in Steps S106 and S111, WN may be received a plurality of times, specifically, twice or more. In the case where WN is received a plurality of times, the reception of WN may be considered to be successful when WN has successfully been received in any of the plurality of attempts, or the reception of WN may be considered to be successful when WN obtained by a plurality of attempts are checked and those WN have consistency similarly to the above-mentioned case of TOW.

In Step S114, the reception control unit 18 notifies the automatic date and time adjustment unit 14 of the obtained TOW and WN. On this occasion, in the case where the reception of WN has failed, information indicating that the reception of WN has failed is notified to the automatic date and time adjustment unit 14. Thus, the automatic date and time adjustment unit 14 can discriminate between the case where the reception of WN has not been attempted and only TOW is notified (the case of Step S110) and the case where TOW is notified in the state in which the reception of WN has failed (Step S114 in the state in which the reception of WN has failed). Then, as described later, the automatic date and time adjustment unit 14 adjusts the date and time or the time based on this notification. Further, after the execution of Step S114, the reception control unit 18 finishes the reception operation. In other words, in the state in which Step S114 is executed, the reception control unit 18 does not limit the reception of WN, but the reception unit 11 receives WN (irrespective of whether the reception has succeeded or failed).

Figure 8:
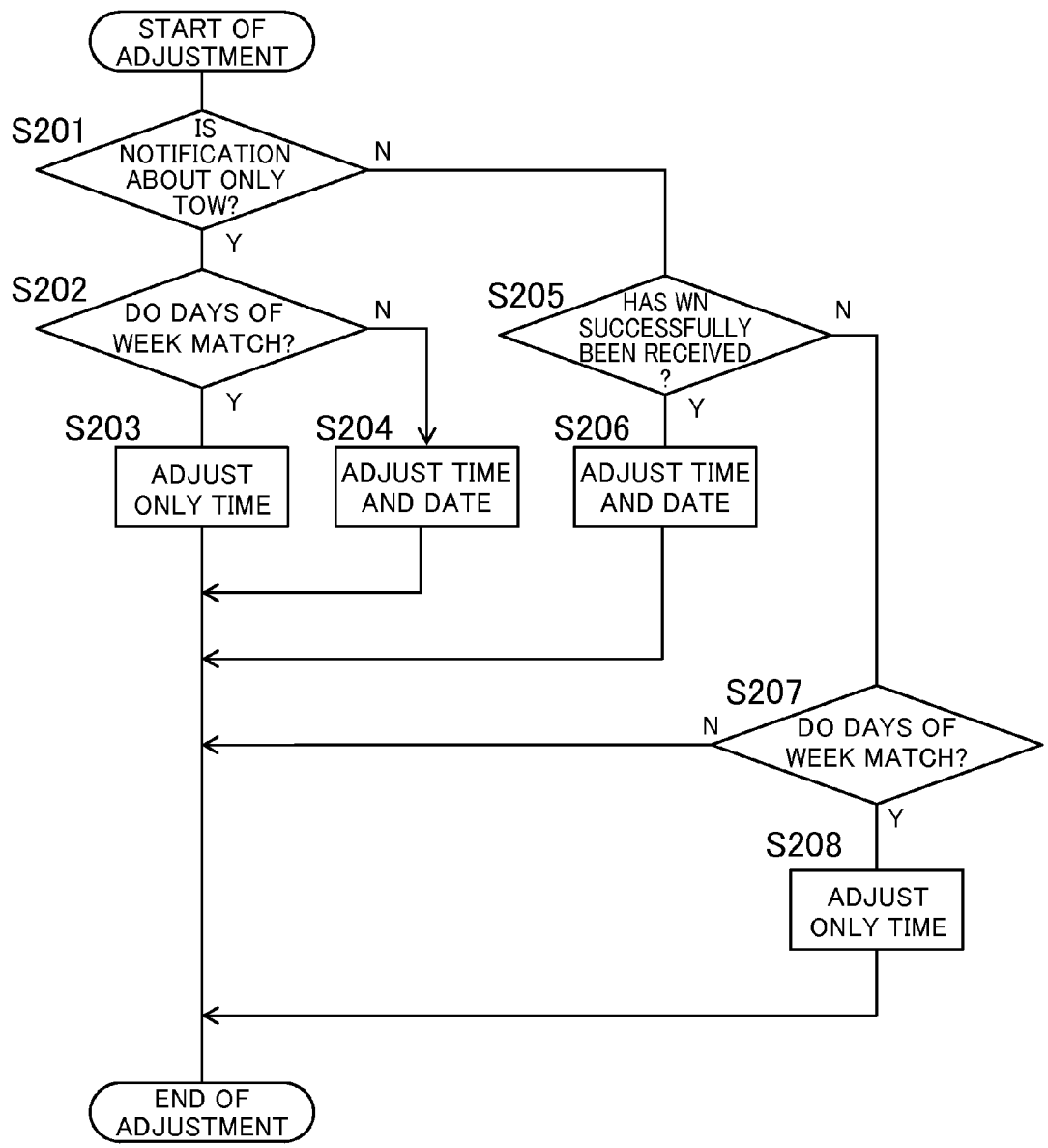
FIG. 8 is a flowchart illustrating an operation of an automatic date and time adjustment unit.

FIG. 8 is a flowchart illustrating the operation of the automatic date and time adjustment unit 14.

The automatic date and time adjustment unit 14 adjusts the date and time counted by the clock circuit 13 based on a notification of TOW or TOW and WN from the reception control unit 18. In response to the notification from the reception control unit 18, the automatic date and time adjustment unit 14 first determines in Step S201 whether or not the notification from the reception control unit 18 includes TOW alone. In other words, Step S201 determines whether or not the notification corresponds to the notification in Step S110 of FIG. 7 described above. When the result is affirmative, the processing proceeds to Step S202, and otherwise proceeds to Step S205.

In Step S202, the automatic date and time adjustment unit 14 determines whether or not a day of week converted from TOW matches with the current day of week counted by the clock circuit 13 (or a day of week converted from the current date). When the result is affirmative, that is, when the days of week match with each other, the processing proceeds to Step S203, and otherwise proceeds to Step S204.

In Step S203, the automatic date and time adjustment unit 14 adjusts only the time out of the date and time counted by the clock circuit 13 based on the time converted from TOW. In Step S204, on the other hand, the automatic date and time adjustment unit 14 adjusts both the time and the date out of the date and time counted by the clock circuit 13 based on the time and the day of week converted from TOW and on WNmem stored in the memory unit 16. When the adjustment is finished, the automatic date and time adjustment unit 14 finishes the processing.

The meaning of Step S202 to Step S204 is now described. When the day of week converted from TOW matches with the current day of week counted by the clock circuit 13 (or the day of week converted from the current date), there is a high possibility that the date counted by the clock circuit 13 is originally accurate. Then, in this embodiment, the clock circuit 13 holds the date and time not as a time of week unlike TOW but in a form in which the time and the date are separate. Thus, by omitting the date adjustment when the date adjustment is unnecessary, unnecessary access to the clock circuit 13 can be reduced. However, this processing is not always necessary, and both the time and the date out of the date and time counted by the clock circuit 13 may be always adjusted. Further, after the finish of those pieces of processing, the user may be notified by some means that the adjustment has been performed.

The processing of Step S202 to Step S204 is summarized as follows. In the case where the reception of WN is limited by the reception control unit 18, the automatic date and time adjustment unit 14 adjusts the time or the date and time counted by the clock circuit 13 based on TOW received by the reception unit 11 and WNmem stored in the memory unit 16, and, when the current day of week specified by TOW is identical to the week specified by the date counted by the clock circuit 13, the automatic date and time adjustment unit 14 adjusts only the time counted by the clock circuit 13 based on TOW.

On the other hand, when the result of Step S201 is negative, that is, when the automatic date and time adjustment unit 14 is notified from the reception control unit 18 of WN in addition to TOW or that the reception of WN has failed, the processing proceeds to Step S205 to determine whether or not WN has successfully been received. When WN has successfully been received and when the automatic date and time adjustment unit 14 is notified of this information, the processing proceeds to Step S206, and the automatic date and time adjustment unit 14 adjusts both the time and the date out of the date and time counted by the clock circuit 13 based on the notified TOW and WN. Further, at the same time, WNmem stored in the memory unit 16 is overwritten by the received WN and updated. After the finish of this processing, the automatic date and time adjustment unit 14 finishes the processing. Further, after the finish of this processing, the user may be notified by some means that the adjustment has been performed.

Note that, when the date is adjusted based on the successfully received WN, the date adjustment flag, the cycle count adjustment flag, and the P/B flag are cleared, and otherwise, the values of the respective flags are maintained, and hence the reception of WN is attempted also in the next reception.

The processing of Step S206 is summarized as follows. In the case where the reception of WN is performed by the reception unit 11 under control of the reception control unit 18, the automatic date and time adjustment unit 14 adjusts the date and time counted by the clock circuit 13 based on TOW and WN received by the reception unit 11.

On the other hand, when the result of Step S205 is affirmative, that is, when the notification that the reception of WN has failed is issued from the reception control unit 18, the processing proceeds to Step S207 to determine whether or not the day of week converted from TOW and the current day of week counted by the clock circuit 13 (or the day of week converted from the current date) match with each other. When this result is affirmative, that is, when the day of week converted from TOW and the current day of week counted by the clock circuit 13 match with each other, the processing proceeds to Step S208, and the automatic date and time adjustment unit 14 adjusts only the time out of the date and time counted by the clock circuit 13 based on the time converted from TOW. On the other hand, when the result of Step S207 is negative, the time adjustment by the automatic date and time adjustment unit 14 is not performed, and the processing is finished.

The meaning of Steps S207 and S208 is now described. In the case where the reception of TOW has succeeded but the reception of WN has failed in the state in which the reception control unit 18 determines that WN needs to be received, the date may become inaccurate if the date and time is adjusted based on TOW. Thus, in such a case, the date and time should not be adjusted normally. As described above, however, when the day of week converted from TOW matches with the current day of week counted by the clock circuit 13 (or the day of week converted from the current date), there is a high possibility that the date counted by the clock circuit 13 is originally accurate. In such a case, it is considered that there is no problem if the time is adjusted, and hence the time is adjusted without wasting the successfully received TOW to keep the time held in the radio-controlled wristwatch 1 accurate. It should be understood that this processing is not always necessary, and the date and time may not be adjusted when the result of Step S205 is negative. Alternatively, when the reception of WN has failed in FIG. 7 described above, the reception control unit 18 may not issue a notification to the automatic date and time adjustment unit 14. Note that, in the case where the time is adjusted in this processing, the user may be notified of the adjustment by some means.

The processing from Step S205 to Step S208 is summarized as follows. In the case where the reception unit 11 is controlled by the reception control unit 18 to attempt to receive WN and where the reception unit 11 has succeeded in receiving TOW but failed to receive WN, when a current day of week specified by TOW received by the reception unit 11 is identical to a day of week specified by the date counted by the clock circuit 13, the automatic date and time adjustment unit 14 adjusts the time counted by the clock circuit 13 based on TOW, whereas, when the current day of week specified by TOW received by the reception unit 11 is different from the day of week specified by the date counted by the clock circuit 13, the automatic date and time adjustment unit 14 is controlled not to adjust the date and time counted by the clock circuit 13.

In the foregoing description, the radio-controlled wristwatch 1 according to this embodiment performs the same control irrespective of the reception form, that is, the forced reception, the regular reception, and the environmental reception, but may perform different controls. For example, in the environmental reception, the reception of WN may be always limited and may not be performed. The reason is that the radio-controlled wristwatch 1 is designed to be worn on the wrist of the user, and the ambient environment easily changes depending on the user's posture during wearing. The environmental reception is configured to sense such changing conditions and attempt to receive under the condition suitable for reception. However, there is no guarantee that the detected favorable condition lasts enough for reception of WN. Thus, there is a high possibility that the reception of WN in the environmental reception may fail, and hence the reception of WN is not executed in view of suppressing power consumption. Accordingly, in the environmental reception, only the date and time is adjusted based on the obtained TOW. In this case, in order to prevent the date from being inaccurate, as described in Step S202 or S207 of FIG. 8, the time may be adjusted only when the day of week obtained from TOW is identical to the day of week converted from the date counted by the clock circuit 13. In addition, in the case where the day of week obtained from TOW is different from the day of week converted from the date counted by the clock circuit 13, WN may be received in the next reception. In this case, the next reception refers to the forced reception or the regular reception to be performed next.

The specific configurations shown in the embodiment described above are merely examples, and a person skilled in the art may make various kinds of modifications. For example, the configurations illustrated as the functional blocks are merely examples, and any configuration maybe employed as long as the same kind of functions can be implemented. Further, the illustrated flowchart is merely an example to show how to implement necessary functions and to carry out necessary procedure, and the procedure of the processing can be determined arbitrarily. In addition, it should be understood that the flow divided into a plurality of pieces of processing may be integrated, and vice versa.

Note that, according to one aspect of the embodiment of the present invention described above, the week information reception limiting means of the radio-controlled wristwatch is configured to control the reception means to receive week specifying information in at least one of the following cases: a) the user has adjusted the current day counted by the clock means; b) the current date and time converted from time-of-week specifying information received by the reception means or the current date and time counted by the clock means falls within a predetermined range with respect to a time point at which the week specifying information is updated; c) a smaller one of differences in a forward direction and in a reverse direction between the current date and time converted from the time-of-week specifying information received by the reception means and the current date and time counted by the clock means extends over the time point at which the week specifying information is updated; d) the clock means has halted due to a decrease in power supply voltage; and e) the user has adjusted information indicating the number of cycles of the week specifying information. In this manner, when the date and time is adjusted based on the received time-of-week specifying information, the week specifying information is received if there is a possibility of erroneously adjusting the date. Consequently, the date is not erroneously adjusted, and the power consumption is reduced because the week specifying information is not received under normal conditions.

Further, according to another aspect of the embodiment of the present invention, the date and time adjustment means of the radio-controlled wristwatch is configured to: adjust, when the reception of the week specifying information is limited by the week information reception limiting means, a time or a date and time counted by the clock means based on the time-of-week specifying information received by the reception means and the week specifying information held in the week information holding means; and adjust, when the reception of the week specifying information is performed by the reception means under control of the week information reception limiting means, the date and time counted by the clock means based on the time-of-week specifying information received by the reception means and the week specifying information received by the reception means. Consequently, when the date and time is adjusted, the date can be prevented from being erroneously adjusted.

Further, according to another aspect of the embodiment of the present invention, the radio-controlled wristwatch is configured so that, when the reception of the week specifying information is limited by the week information reception limiting means and when a current day of week specified by the time-of-week specifying information received by the reception means is identical to a day of week specified by the date counted by the clock means, the date and time adjustment means adjusts only the time counted by the clock means based on the time-of-week specifying information received by the reception means. Consequently, when the date counted by the clock means is expected to be correct, only the time is adjusted, to thereby reduce the time and power required for time adjustment.

Further, according to another aspect of the embodiment of the present invention, the radio-controlled wristwatch is configured so that, in a case where the reception means is controlled by the week information reception limiting means to attempt to receive the week specifying information and where the reception means has succeeded in receiving the time-of-week specifying information but failed to receive the week specifying information: the date and time adjustment means adjusts a time counted by the clock means based on the time-of-week specifying information received by the reception means when a current day of week specified by the time-of-week specifying information received by the reception means is identical to a day of week specified by the date counted by the clock means; and the date and time adjustment means is controlled not to adjust the date and time counted by the clock means when the current day of week specified by the time-of-week specifying information received by the reception means is different from the day of week specified by the date counted by the clock means. Consequently, even in the case where there is a possibility that the date may be erroneously adjusted if the date and time is adjusted based on the received time-of-week specifying information, when the date counted by the clock means is expected to be correct, only the time is adjusted, to thereby reduce the time and power required for time adjustment.

The invention claimed is:

1. A radio-controlled wristwatch, comprising:
a reception unit for receiving a radio wave to extract time-of-week specifying information and week specifying information;
a clock for counting a current date and time;
a date and time adjustment unit for adjusting the current date and time counted by the clock;
a week information holding unit for holding the week specifying information;
a week information updating unit for updating the week specifying information held in the week information holding unit based on the current date and time counted by the clock; and
a week information reception limiting unit for limiting the reception of the week specifying information performed by the reception unit, and controlling the reception unit to receive the week specifying information in a predetermined case,
wherein the week information reception limiting unit is configured to control the reception unit to receive the week specifying information in at least one of the cases a) and d) and at least one of cases b), c), and e), wherein
in case a) a user has adjusted a date counted by the clock;
in case b) a date and time converted from the time-of-week specifying information received by the reception unit or a date and time counted by the clock falls within a predetermined range with respect to a time point at which the week specifying information is updated;
in case c) in accordance with the time-of-week specifying information received by the reception unit,
a difference in the forward direction is defined as a difference between the date and time converted from the time of week and the date and time counted by the clock when assuming that the date and time converted from the time of week is located in the forward direction with respect to the date and time counted by the clock,
a difference in the reverse direction is defined as a difference between the date and time converted from the time of week and the date and time counted by the clock when assuming that the date and time converted from the time of week is located in the reverse direction with respect to the date and time counted by the clock,
a smaller one of the difference in the forward direction and the difference in the reverse direction extends over the time point at which the week specifying information is updated;
in case d) the clock has halted due to a decrease in power supply voltage; and
in case e) the user has adjusted information indicating a number of cycles of the week specifying information.

2. The radio-controlled wristwatch according to claim 1, wherein the date and time adjustment unit is configured to:
adjust a time or a date and time counted by the clock based on the time-of-week specifying information received by the reception unit and the week specifying information held in the week information holding unit, when the reception of the week specifying information is limited by the week information reception limiting unit; and
adjust the date and time counted by the clock based on the time-of-week specifying information received by the reception unit and the week specifying information received by the reception unit, when the reception of the week specifying information is performed by the reception unit under control of the week information reception limiting unit.

3. The radio-controlled wristwatch according to claim 2, wherein the reception unit is controlled to receive the time-of-week specifying information a plurality of times in a case where a date counted by the clock is adjusted by a user or where the week specifying information held in the week information holding unit is unreliable, and,
the date and time adjustment unit adjusts a time or a date and time counted by the clock based on the obtained plurality of pieces of the time-of-week specifying information when the obtained plurality of pieces of the time-of-week specifying information have consistency.

4. The radio-controlled wristwatch according to claim 3, wherein the week information reception limiting unit limits the reception of the week specifying information performed by the reception unit when the reception by the reception unit is performed based on information indicating an ambient environment of the radio-controlled wristwatch.

5. The radio-controlled wristwatch according to claim 2, wherein the week information reception limiting unit limits the reception of the week specifying information performed by the reception unit when the reception by the reception unit is performed based on information indicating an ambient environment of the radio-controlled wristwatch.

6. The radio-controlled wristwatch according to claim 1, wherein the reception unit is controlled to receive the time-of-week specifying information a plurality of times in a case where a date counted by the clock is adjusted by a user or where the week specifying information held in the week information holding unit is unreliable, and, the date and time adjustment unit adjusts a time or a date and time counted by the clock based on the obtained plurality of pieces of the time-of-week specifying information when the obtained plurality of pieces of the time-of-week specifying information have consistency.

7. The radio-controlled wristwatch according to claim 6, wherein the week information reception limiting unit limits the reception of the week specifying information performed by the reception unit when the reception by the reception unit is performed based on information indicating an ambient environment of the radio-controlled wristwatch.

8. The radio-controlled wristwatch according to claim 1, wherein the week information reception limiting unit limits the reception of the week specifying information performed by the reception unit when the reception by the reception unit is performed based on that an information indicating an ambient environment of the radio-controlled wristwatch indicates a suitable condition.

9. A radio-controlled wristwatch, comprising:
    a reception unit for receiving a radio wave to extract time-of-week specifying information and week specifying information;
    a clock for counting a current date and time;
    a date and time adjustment unit for adjusting the current date and time counted by the clock;
    a week information holding unit for holding the week specifying information;
    week information updating unit for updating the week specifying information held in the week information holding unit based on the current date and time counted by the clock; and
    week information reception limiting unit for limiting the reception of the week specifying information performed by the reception unit, and controlling the reception unit to receive the week specifying information in a predetermined case,
    wherein the date and time adjustment unit is configured to:
        adjust a time or a date and time counted by the clock unit based on the time-of-week specifying information received by the reception unit and the week specifying information held in the week information holding unit, when the reception of the week specifying information is limited by the week information reception limiting unit;
        adjust the date and time counted by the clock unit based on the time-of-week specifying information received by the reception unit and the week specifying information received by the reception unit, when the reception of the week specifying information is performed by the reception unit under control of the week information reception limiting unit;
        adjust only the time counted by the clock based on the time-of-week specifying information received by the reception unit, when the reception of the week specifying information is limited by the week information reception limiting unit and when a current day of week specified by the time-of-week specifying information received by the reception unit is identical to a day of week specified by the date counted by the clock; and
        adjust the date counted by the clock unit, when the reception of the week specifying information is limited by the week information reception limiting unit and when a current day of week specified by the time-of-week specifying information received by the reception unit is different from a day of week specified by the date counted by the clock.

10. The radio-controlled wristwatch according to claim 9, wherein the reception unit is controlled to receive the time-of-week specifying information a plurality of times in a case where a date counted by the clock is adjusted by a user or where the week specifying information held in the week information holding unit is unreliable, and, the date and time adjustment unit adjusts a time or a date and time counted by the clock based on the obtained plurality of pieces of the time-of-week specifying information when the obtained plurality of pieces of the time-of-week specifying information have consistency.

11. The radio-controlled wristwatch according to claim 10, wherein the week information reception limiting unit limits the reception of the week specifying information performed by the reception unit when the reception by the reception unit is performed based on information indicating an ambient environment of the radio-controlled wristwatch.

12. The radio-controlled wristwatch according to claim 9, wherein the week information reception limiting unit limits the reception of the week specifying information performed by the reception unit when the reception by the reception unit is performed based on information indicating an ambient environment of the radio-controlled wristwatch.

13. A radio-controlled wristwatch, comprising:
    a reception unit for receiving a radio wave to extract time-of-week specifying information and week specifying information;
    a clock for counting a current date and time;
    a date and time adjustment unit for adjusting the current date and time counted by the clock;
    a week information holding unit for holding the week specifying information;
    a week information updating unit for updating the week specifying information held in the week information holding unit based on the current date and time counted by the clock; and
    a week information reception limiting unit for limiting the reception of the week specifying information performed by the reception unit, and controlling the reception unit to receive the week specifying information in a predetermined case,
    wherein, in a case where the reception unit is controlled by the week information reception limiting unit to attempt to receive the week specifying information and where the reception unit has succeeded in receiving the time-of-week specifying information but failed to receive the week specifying information:
    the date and time adjustment unit adjusts a time counted by the clock based on the time-of-week specifying information received by the reception unit when a current day of week specified by the time-of-week specifying information received by the reception unit is identical to a day of week specified by the date counted by the clock; and
    the date and time adjustment unit is controlled not to adjust the date and time counted by the clock when the current day of week specified by the time-of-week specifying information received by the reception unit is different from the day of week specified by the date counted by the clock.

14. The radio-controlled wristwatch according to claim 13, wherein the reception unit is controlled to receive the time-of-week specifying information a plurality of times in a case where a date counted by the clock is adjusted by a user or where the week specifying information held in the week information holding unit is unreliable, and, the date and time adjustment unit adjusts a time or a date and time counted by the clock based on the obtained plurality of pieces of the time-of-week specifying information when the obtained plurality of pieces of the time-of-week specifying information have consistency.

15. The radio-controlled wristwatch according to claim 14, wherein the week information reception limiting unit limits the reception of the week specifying information performed by the reception unit when the reception by the reception unit is performed based on information indicating an ambient environment of the radio-controlled wristwatch.

16. The radio-controlled wristwatch according to claim 13, wherein the week information reception limiting unit limits the reception of the week specifying information performed by the reception unit when the reception by the reception unit is performed based on information indicating an ambient environment of the radio-controlled wristwatch.

* * * * *